(12) United States Patent
Goleski et al.

(10) Patent No.: US 9,222,526 B2
(45) Date of Patent: Dec. 29, 2015

(54) CLUTCH HOUSING AND ASSEMBLY

(71) Applicant: FORD GLOBAL TECHNOLOGIES, LLC, Dearborn, MI (US)

(72) Inventors: Gregory D. Goleski, Rochester Hills, MI (US); Jeffrey E. Maurer, Commerce, MI (US); Steven G. Thomas, Bloomfield Hills, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 62 days.

(21) Appl. No.: 13/658,058

(22) Filed: Oct. 23, 2012

(65) Prior Publication Data

US 2014/0110209 A1 Apr. 24, 2014

(51) Int. Cl.
  *F16D 25/10* (2006.01)
  *F16D 25/0638* (2006.01)
  *F16H 63/30* (2006.01)
  *F16D 48/02* (2006.01)
  *F16D 48/06* (2006.01)

(52) U.S. Cl.
  CPC ............ *F16D 25/0638* (2013.01); *F16D 25/10* (2013.01); *F16D 48/0206* (2013.01); *F16D 48/062* (2013.01); *F16D 48/064* (2013.01); *F16H 63/30* (2013.01)

(58) Field of Classification Search
  USPC ................ 475/116, 146, 296, 269, 280, 282; 192/82.25, 85.39, 106 F, 48.601, 192/48.609, 48.611, 48.619, 48.614
  See application file for complete search history.

(56) References Cited

U.S. PATENT DOCUMENTS

| | | | | |
|---|---|---|---|---|
| 3,688,601 | A | * | 9/1972 | Dach et al. .................... 475/146 |
| 3,858,698 | A | * | 1/1975 | Hause ...................... 192/48.611 |
| 4,957,195 | A | * | 9/1990 | Kano et al. ................. 192/106 F |
| 4,958,753 | A | * | 9/1990 | Nogle et al. ............. 192/48.611 |
| 5,887,690 | A | * | 3/1999 | Haupt ...................... 192/48.611 |
| 2008/0006503 | A1 | * | 1/2008 | Diosi et al. ...................... 192/76 |
| 2012/0145511 | A1 | * | 6/2012 | Wilton ....................... 192/85.17 |
| 2013/0157797 | A1 | * | 6/2013 | Diemer et al. ............... 475/276 |

* cited by examiner

Primary Examiner — Ramya Burgess
Assistant Examiner — Lillian Nguyen
(74) Attorney, Agent, or Firm — James Dottavio; MacMillan, Sobanski & Todd, LLC

(57) ABSTRACT

A clutch assembly includes first, second and third clutches, a housing including a first projection to which the first clutch selectively produces a connection, a second projection to which the second and third clutches selectively produce connections, clutch-apply circuits each circuit corresponding to one of the clutches, and a balance volume circuit for supplying fluid to each of the clutches, and a shaft rotatably supporting the housing.

9 Claims, 2 Drawing Sheets

FIG. 2

CLUTCH HOUSING AND ASSEMBLY

BACKGROUND OF THE INVENTION

1. Field of the Invention

This invention relates generally to an apparatus for an independent, rotating, multi-clutch assembly having no fixed connection to a component of a gearset.

2. Description of the Prior Art

The kinematic arrangement of automatic transmissions, certain control elements, such as hydraulically-actuated clutches, have no fixed connection to any other transmission lever component.

In such cases, a need exists for a technique that simplifies the feed circuit to those clutches, i.e. pressure feeds for each of three clutch-apply circuits and a lube circuit that supplies three balance dams.

The technique and its design implementation must be such that the device can be produced at low cost and weight and perform with high reliability and endurance.

SUMMARY OF THE INVENTION

A clutch assembly includes first, second and third clutches, a housing including a first projection to which the first clutch selectively produces a connection, a second projection to which the second and third clutches selectively produce connections, clutch-apply circuits each circuit corresponding to one of the clutches, and a balance volume circuit for supplying fluid to each of the clutches, and a shaft supporting the housing in rotation.

Three clutches are integrated into a rotating clutch housing, which includes four feed circuits. A lube circuit supplies three clutch balance dams. A clutch-apply circuit communicates with each of the clutches. When no clutch is applied, the clutch housing has no fixed connection to any gearset component.

The scope of applicability of the preferred embodiment will become apparent from the following detailed description, claims and drawings. It should be understood, that the description and specific examples, although indicating preferred embodiments of the invention, are given by way of illustration only. Various changes and modifications to the described embodiments and examples will become apparent to those skilled in the art.

DESCRIPTION OF THE DRAWINGS

The invention will be more readily understood by reference to the following description, taken with the accompanying drawings, in which.

DESCRIPTION OF THE PREFERRED EMBODIMENT

Figure 1:
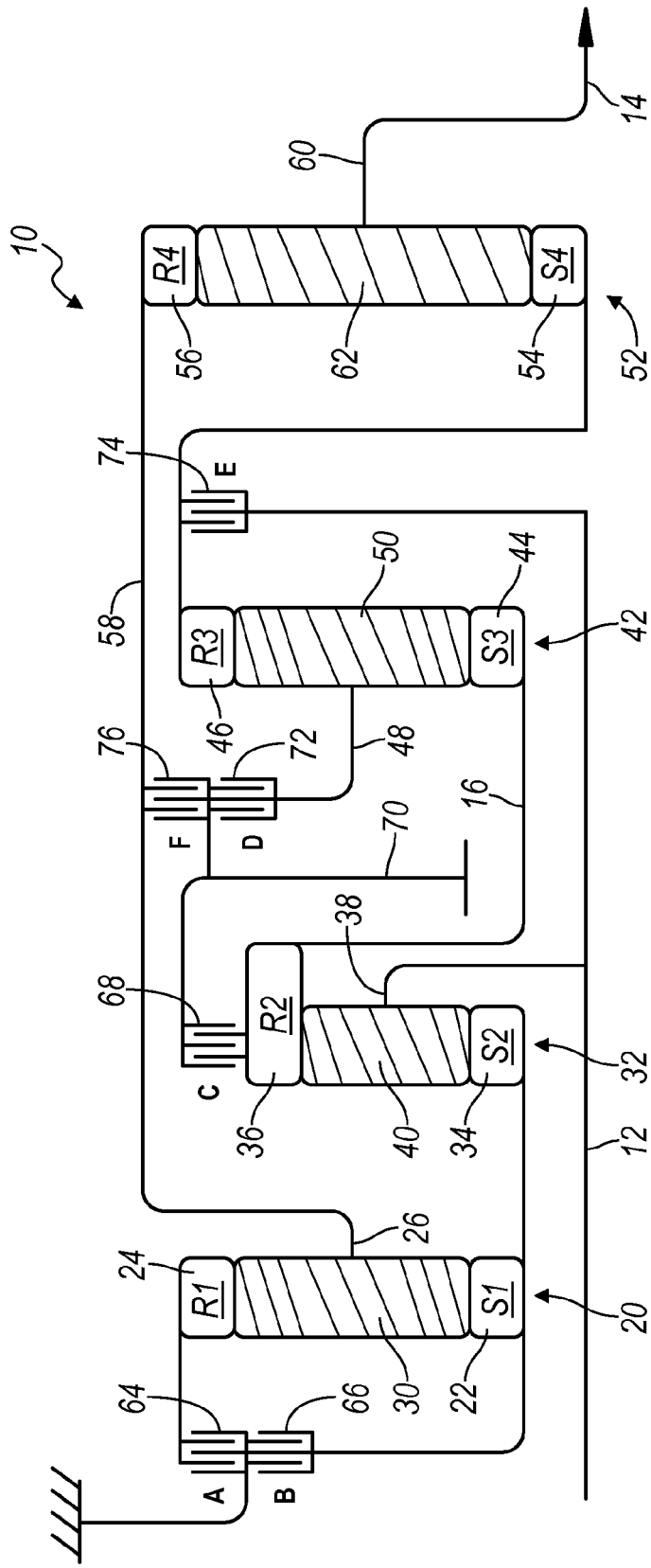
FIG. 1 is a schematic diagram showing a side view of the kinematic assembly for an automatic transmission for a motor vehicle.

The assembly 10 FIG. 1 includes an input 12; output 14; intermediate shaft 16; a first planetary gear set 20 having a first sun gear 22, a first ring gear 24, a first carrier 26; and a set of planet pinions 30 supported on carrier 26 and in continuous meshing engagement with the sun gear 22 and the ring gear 24.

A second planetary gear set 32 includes a second sun gear 34 fixedly coupled to sun gear 22; a second ring gear 36; a second carrier 38 fixedly coupled to the input 12; and a set of planet pinions 40 in supported on carrier 38 and in continuous meshing engagement with sun gear 34 and ring gear 36.

A third planetary gear set 42 includes a third sun gear 44 fixedly coupled to ring gear 36; a third ring gear 46; a third carrier 48; and a set of planet pinions 50 supported on carrier 48 and in continuous meshing engagement with sun gear 44 and ring gear 46.

A fourth planetary gear set 52 includes a fourth sun gear 54 fixedly coupled to ring gear 46; a fourth ring gear 56 fixedly coupled by a shell 58 to carrier 26; a fourth carrier 60 fixedly coupled to output 14; and a set of planet gears 62 supported on carrier 60 and in continuous meshing engagement with sun gear 54 and ring gear 56.

A first brake 64 selectively holds ring gear 24 against rotation.

A second brake 66 selectively holds sun gears 22, 34 against rotation on a transmission case 124.

A first clutch 68 selectively couples ring gear 36 to a clutch housing 70 rotation also on the transmission case 124.

A second clutch 72 selectively couples carrier 48 to clutch housing 70.

A third clutch 74 selectively couples ring gear 46 and sun gear 54 to input 12.

A fourth clutch 76 selectively couples shell 58 to clutch housing 70.

Figure 2:
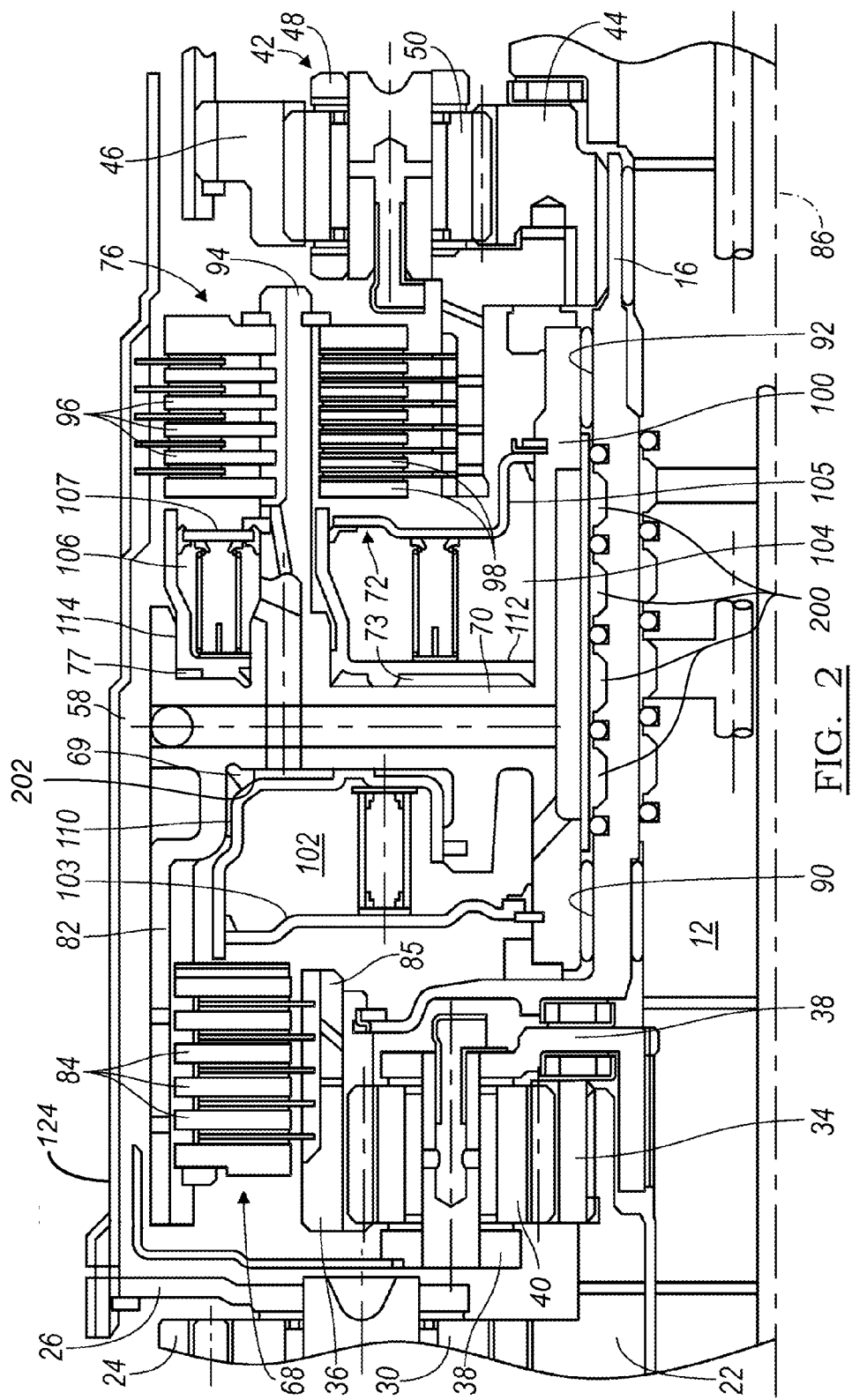
FIG. 2 is a cross section of the kinematic assembly of FIG. 1.

FIG. 2 shows that carrier 38 is secured to drum shell 58.

Clutch housing 70 includes a hub 100 with a radial member 202 extending radially outward from the hub 100, an axial arm 82, extending axially from the radial member 202, formed with internal spline teeth, to which external teeth on the spacer plates 84 of clutch 68 are fixed for rotation with clutch housing 70. The friction plates of clutch 68 are splined to external spline teeth formed on a ring 85, which is formed with ring gear 36.

Intermediate shaft 16, which extends along axis 86 on the radial outer side of input 12, is secured to ring 85 where a snap ring 88 completes the connection. Clutch housing 70 is supported by axially spaced bushings 90, 92 on the radial outer surface of intermediate shaft 16.

Clutch housing 70 includes another axial arm 94, extending axially from the radial member 202, formed with external spline teeth, to which internal teeth on the spacer plates 96 of clutch 76 are fixed for rotation with clutch housing 70. The friction plates of clutch 76 are splined to internal spline teeth formed on a shell 58.

External teeth 98 on the spacer plates of clutch 72 engage internal spline teeth formed on arm 94 of the clutch housing 70. The friction plates of clutch 72 are splined to external spline teeth formed on carrier 48.

Located between bushings 90, 92 and formed in the hub 100 of clutch housing 70 are four feed circuits 200. A single balance oil feed supplies automatic transmission fluid (ATF) to the pressure balance volumes 102, 104, 106 of clutches 68, 72, 76. Balance dams 103, 105, 107 seal the pressure balance volumes 102, 104, 106 at the pistons 110, 112, 114 of the clutches 68, 72, 76.

Each of the servo cylinders 69, 73, 77 of clutches 68, 72, 76 is supplied with actuating pressure through individual circuits 200 formed in the clutch housing 70. When no actuating pressure is applied to clutches 68, 72, 76, the clutch housing 70 has no fixed connection to any other component of assembly 10.

In accordance with the provisions of the patent statutes, the preferred embodiment has been described. However, it should be noted that the alternate embodiments can be practiced otherwise than as specifically illustrated and described.

The invention claimed is:

1. An assembly, comprising:
a shaft;
an intermediate shaft radially outward of and supported on the shaft and rotatable relative to the shaft;
first, second and third clutches;
a housing including a radial member, a first arm, extending axially from the radial member, to which the first clutch selectively produces a connection, a second arm, extending axially from the radial member, to which the second and third clutches selectively produce connections, hydraulic feed circuits extending through the housing, each circuit configured to actuate a corresponding one of the clutches, and a balance volume circuit for supplying fluid to each of the clutches; the housing supported on the intermediate shaft radially outward from the intermediate shaft and rotatable relative to the shaft and the intermediate shaft.

2. The assembly of claim 1, wherein the first arm includes first spline teeth engaged by first plates of the first clutch.

3. The assembly of claim 1 wherein the second clutch is radially inward from the second arm and the third clutch is radially outward from and axially aligned with the second clutch.

4. The assembly of claim 2, further comprising a ring secured to the shaft and engaged by second plates of the first clutch, wherein the ring is formed integrally with a ring gear of a first planetary gearset.

5. The assembly of claim 1, wherein the second arm includes first spline teeth engaged by first plates of the second clutch.

6. The assembly of claim 5, further comprising:
a drum secured to a rotating member of a planetary gearset and engaged by second plates of the second clutch.

7. The assembly of claim 1, wherein the second arm includes second spline teeth engaged by first plates of the third clutch.

8. The assembly of claim 7, further comprising a carrier of a third planetary gearset, the carrier engaged by second plates of the third clutch.

9. The assembly of claim 1, wherein each of the clutches further comprises:
a cylinder located in the housing, hydraulically communicating with a corresponding one of the circuits;
a piston located in the cylinder;
a balance dam located in the cylinder, hydraulically sealed against the piston and the cylinder and defining a balance volume communicating with the balance volume circuit; and
a spring urging the piston away from the balance dam.

* * * * *